United States Patent
Tennison et al.

(10) Patent No.: US 7,111,775 B1
(45) Date of Patent: Sep. 26, 2006

(54) BUCKSLIP LEAD GENERATION SYSTEM

(75) Inventors: Glen Tennison, Oakville (CA); Edward Mark Warren, Rockwood (CA); Robert James Metras, Cambridge (CA)

(73) Assignee: PetCare Insurance Brokers Limited, Oakville (CA)

( * ) Notice: Subject to any disclaimer, the term of this patent is extended or adjusted under 35 U.S.C. 154(b) by 0 days.

(21) Appl. No.: 11/079,297

(22) Filed: Mar. 15, 2005

(51) Int. Cl.
*G06F 17/00* (2006.01)

(52) U.S. Cl. ..................................... 235/375
(58) Field of Classification Search .............. 705/14, 705/15, 11, 26, 21, 2; 235/375, 472.03, 462.01
See application file for complete search history.

(56) References Cited

U.S. PATENT DOCUMENTS

| | | | |
|---|---|---|---|
| 4,553,222 A * | 11/1985 | Kurland et al. ............... 705/15 |
| 5,995,942 A | 11/1999 | Smith et al. |
| 6,415,262 B1 | 7/2002 | Walker et al. |
| 6,694,300 B1 | 2/2004 | Walker et al. |
| 2001/0014868 A1 * | 8/2001 | Herz et al. .................... 705/14 |
| 2002/0065720 A1 * | 5/2002 | Carswell et al. ............... 705/14 |
| 2002/0156917 A1 * | 10/2002 | Nye ........................... 709/238 |
| 2003/0046142 A1 * | 3/2003 | Eitel et al. ..................... 705/11 |
| 2003/0195823 A1 | 10/2003 | Bell et al. |
| 2003/0200146 A1 * | 10/2003 | Levin et al. .................. 705/14 |
| 2003/0204417 A1 * | 10/2003 | Mize .............................. 705/2 |
| 2003/0212595 A1 * | 11/2003 | Antonucci .................... 705/14 |
| 2003/0236712 A1 | 12/2003 | Antonucci et al. |
| 2004/0056101 A1 * | 3/2004 | Barkan et al. ......... 235/472.03 |
| 2004/0143491 A1 * | 7/2004 | Steinberg ..................... 705/14 |
| 2005/0027607 A1 | 2/2005 | Pearson |
| 2005/0043996 A1 * | 2/2005 | Silver ........................ 705/15 |
| 2005/0075932 A1 * | 4/2005 | Mankoff ...................... 705/14 |
| 2005/0145187 A1 | 7/2005 | Gray |
| 2006/0026039 A1 | 2/2006 | Shoenhair et al. |

FOREIGN PATENT DOCUMENTS

JP 2002183455 A2 6/2002
WO WO 03/012600 2/2003

* cited by examiner

*Primary Examiner*—Thien M. Le
*Assistant Examiner*—Thien Mai

(57) ABSTRACT

A system and method for generating well qualified sales leads to a service provider, using a novel buckslip, brochure or coupon promoting a product or service not usually carried by a retailer. The buckslip has a universal product code (UPC) barcode which can be scanned at a retailer's point-of-sale device, along with the customer's retail loyalty card or other unique identifier that is linked to a database of customer contact information. The buckslip provides instructions to the customer to contact the service provider to purchase the service. In a daily process, the service provider sends a list of the customers who have purchased the service, to the retailer. The retailer then sends a list to the provider with contact information for interested customers who have not yet purchased the service, within a predetermined time period.

31 Claims, 6 Drawing Sheets

Back of Promotional Coupon

BUCKSLIP LEAD GENERATION SYSTEM

CROSS-REFERENCE TO RELATED APPLICATIONS

This is the first application filed for the present invention.

TECHNICAL FIELD

The present invention relates to retail systems and more particularly to a retail loyalty customer lead generation and tracking system.

BACKGROUND OF THE INVENTION

The provision of goods (e.g. food and clothing) and services (e.g. insurance, medical services and banking) to today's consumers are manifested through a variety of channels and in a variety of different outlets including those of both retailers and service providers. A number of large scale retailers have attempted to branch out from solely offering goods to consumers and have expanded to offer services that are more traditionally provided by service providers. However, this latter strategy can be time consuming, costly and legally taxing for retailers because the sale of many of the services to consumers are subject to state legislation.

The provision of services to consumers usually requires large sums of marketing expenses but with unknown returns. It would thus be highly advantageous to have a system or method for targeting marketing resources to interested customers. It would also be highly desirable if such a system or method provided a mechanism for generating and tracking sales leads.

As is well known in the art, many retailers keep track of retail customers' buying habits through loyalty card programs that incorporate: the capture and storage of the individual name and contact details for each loyalty card member (LCM); the provision to each LCM of a unique alpha-numeric loyalty member identifier which may be recorded on a loyalty card provided to the LCM; and the retention of a retailer's database in which the name and contact details for each LCM are tied to the LCM's loyalty member identifier. These loyalty card programs are usually tied into the retail data management system, so that a LCM's loyalty card can be scanned at a point-of-sale terminal using a magnetic card reader or a universal product code (UPC) barcode scanner, during the checkout process, so that a LCM's purchases can be registered against the LCM's loyalty member identifier.

It is also well known in the art to provide discount coupons to retail customers, to encourage them to purchase specific goods. Discount coupons typically promote a specific product and provide a discount price or other introductory offer when presented with the product at the time of purchase at a retailer. Traditional coupons are therefore used at a retailer, to promote sales of retail products carried by the retailer.

It would be highly advantageous to provide a sales promotion mechanism to promote sales of services not usually carried by retailers. It would be further advantageous to provide a mechanism for generating targeted sales leads.

SUMMARY OF THE INVENTION

The present invention provides retailers a system through which they may offer their loyalty card members (LCM) access to services provided by service providers while opening up new targeted marketing channels to LCMs.

It is therefore an object of the present invention to provide a sales promotion mechanism to promote sales of services not usually carried by retailers.

In general terms, the present invention uses in-store brochures or buck-slips to promote a service not usually carried by a retailer. An example of such a service is pet health insurance promoted within a retail pet store.

The brochure instructs an interested customer to scan the universal product code (UPC) barcode of the brochure at checkout. If the interested customer does not initiate contact with the service provider within a certain time period, the retailer will send the customer's contact information to the service provider.

Accordingly, an aspect of the present invention provides a method of sales lead generation for a service provider from a customer interested in a promotion for a service. The method comprises steps of: recording a customer identifier at a retailer point-of-sale device; recording a promotion identifier code presented by the customer, at the point-of-sale device; retrieving customer contact information for the customer from a database, in response to recording the customer identifier and promotion identifier code; and sending the customer contact information to the service provider.

In some embodiments, the step of recording a promotion identifier code comprises recording the promotion identifier code from a brochure.

In some embodiments, the brochure contains directions for the customer to initiate the purchase of the service from the service provider.

In some embodiments, the step of sending the customer contact information to the service provider occurs only if the customer does not initiate the purchase of the service within a predetermined period of time.

In other embodiments, the promotion identifier code comprises a universal product code (UPC), and the step of recording the promotion identifier code from a brochure comprises scanning the UPC.

In other embodiments, the step of recording the promotion identifier code from a brochure further comprises recording the UPC as a sale in a retail transaction system with a zero sale value.

In still other embodiments, the step of recording a customer identifier comprises recording a loyalty customer number.

In yet other embodiments, the step of recording a loyalty customer number comprises scanning a loyalty card.

In other embodiments, the steps of retrieving customer contact information and sending said customer contact information to the service provider, are performed by a loyalty program service.

In other embodiments, the step of sending said customer contact information is preceded by steps of: receiving from the service provider, a list of customers who have purchased the service; and verifying that the customer has not purchased the service.

In yet other embodiments, the step of verifying that the customer has not purchased the service, comprises removing records of customers who have purchased the service from the service provider, from the customer contact information to be sent to the service provider.

In other embodiments, the method further comprises a step of, at the service provider, adding the customer contact information to an outbound sales call queue.

In some embodiments, the service is not offered by the retailer.

A further aspect of the present invention provides a promotional material for promoting at a retailer, a service offered by a service provider. The promotional material comprises: a promotion identifier, adapted to identify the service to a customer; directions for the customer to purchase the service from the service provider; and a promotion identifier code, adapted for scanning at a point-of-sale device at said retailer; wherein the promotion identifier code is adapted to identify the customer presenting said promotional material as interested in purchasing the service from the service provider.

In some embodiments, the promotion identifier code is associated with a zero value purchase at the retailer.

In some embodiments, the promotion identifier code is a universal product code (UPC) bar code.

In other embodiments, the format of the promotional material can be a brochure, a coupon, a flyer, a shelf marker, a buckslip or a poster.

In still other embodiments, the service provider can be an insurance provider, a veterinary clinic, an animal shelter, an animal rescue organization, an animal tagging service, or an animal microchip database service.

A further aspect of the present invention provides a system for sales lead generation at a retailer, for a service provider offering a service. The system comprises: a customer identifier scanning means at a point-of-sale device at the retailer, for scanning a customer identifier presented by a customer; a promotion identifier code scanning means at the point-of-sale device at the retailer, for scanning a promotion identifier code presented by the customer; a retail transaction system adapted to accept input from said customer identifier scanning means and said promotion identifier code scanning means; a customer database for storing customer contact information; and a sales system at a service provider, adapted to communicate with the customer database. The retail transaction system is adapted to retrieve customer contact information from the customer database. The customer contact information is associated with a customer identifier, in response to accepting the promotion identifier code and the customer identifier, presented by the customer. The retail transaction system is further adapted to communicate the customer contact information to the sales system.

In some embodiments, the retail transaction system is adapted to communicate the customer contact information to the sales system, only if the customer does not initiate the purchase of the service within a predetermined period of time.

In other embodiments, the retail transaction system is further adapted to receive from the sales system, a list of customers who have purchased the service within the predetermined period of time and verifying that the customer has not purchased the service within the predetermined period of time.

In other embodiments, the retail transaction system is further adapted to verify that the customer has not purchased the service, by removing records of customers who have purchased the service, from the customer contact information to be communicated to the sales system.

In yet other embodiments, the sales system is adapted to add the customer contact information, to an outbound sales call queue.

In other embodiments, the promotion identifier code scanning means is a barcode scanner, adapted to scan the promotion identifier code encoded as a barcode.

In still other embodiments, the barcode scanner is adapted to read a universal product code (UPC) barcode from the promotion identifier.

In still other embodiments, the retail transaction system is adapted to associate a zero value purchase with the UPC barcode for the promotion identifier.

In yet other embodiments, the customer identifier scanning means is the same barcode scanner, which is adapted to scan the customer identifier encoded as a barcode.

In other embodiments, the customer identifier scanning means is adapted to scan the customer identifier barcode from a customer loyalty card.

In other embodiments, the customer identifier scanning means is a magnetic card reader and is adapted to scan a customer identifier encoded on a magnetic strip on a card.

In other embodiments, the promotion identifier code scanning means is adapted to scan the promotion identifier UPC barcode from a promotional material which can be a brochure, a coupon, a flyer, a shelf marker, a buckslip or a poster.

In still other embodiments, the service provider offers a service or product not carried by the retailer.

In yet other embodiments, the retail transaction system is a centralized retail transaction system for a plurality of retailer outlets.

In other embodiments, each of the plurality of retailer outlets has a local retail transaction system and the centralized retail transaction system can communicate with each local retail transaction system.

BRIEF DESCRIPTION OF THE DRAWINGS

Further features and advantages of the present invention will become apparent from the following detailed description, taken in combination with the appended drawings, in which.

It will be noted that, throughout the appended drawings, like features are identified by like reference numerals.

DETAILED DESCRIPTION OF THE PREFERRED EMBODIMENT

Figure 1:
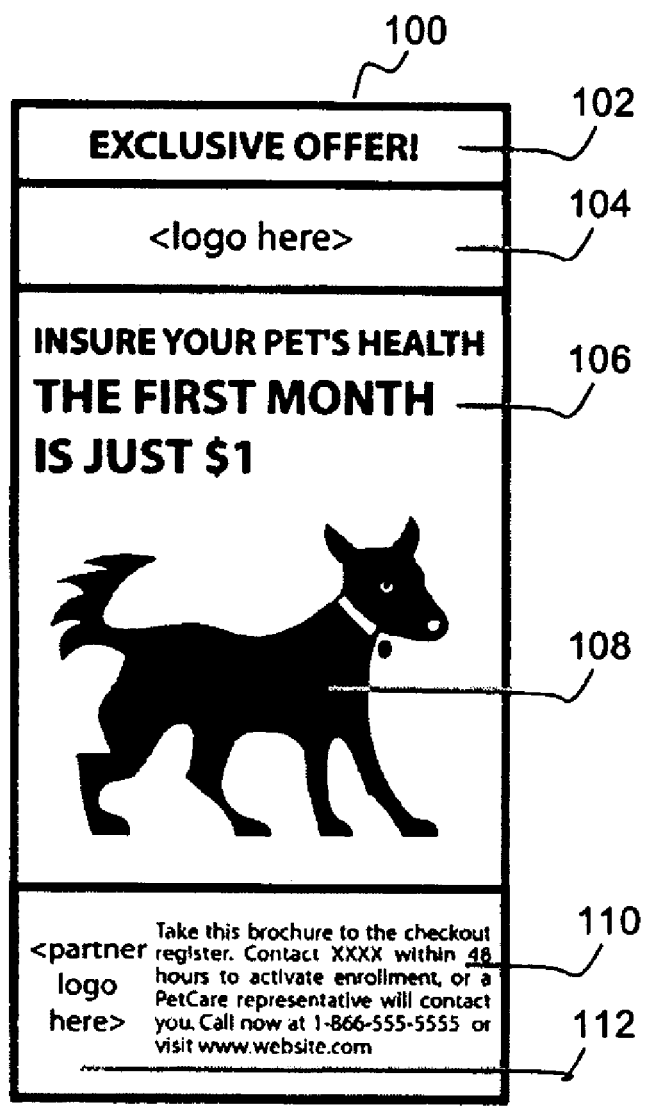
FIG. 1 illustrates the front side of an embodiment of a promotional coupon of the present invention.

The present invention provides a method, system and product for generating sales leads using brochures or coupons in a retail store to promote a service from a service provider.

Briefly stated, the present invention provides an efficient way to generate well targeted sales leads using a retail customer loyalty program in conjunction with a promotional coupon or brochure having a UPC. The UPC of the novel brochure is used indicate a customer's interest in a service offered by a service provider. Customers who are interested in benefiting from the advertised promotion for the service are encouraged to scan the brochure along with their purchases at the point-of-sale device at checkout.

The UPC is associated with a zero value sale and it identifies the customer who presented it, as interested in the promoted service. Scanning the UPC triggers the retail computer system to track customers who have scanned the brochures, retrieve the customers' contact information and supply the contact information to a service provider offering the service promoted by the brochure. Customers are encouraged to initiate a purchase of the service by contacting the service provider either through an on-line website or by calling a toll-free number. In the event that the these customers do not follow through with the purchase of the service, the service provider receives the contact information for these customers. These customers are interested in the service offered and thus are well targeted sales leads.

Retailers suitable for this system include retailers having a customer loyalty program that incorporates: the capture and storage of the customer name and contact information; the provision to each loyalty customer, of a unique identifier; and a loyalty program database in which he customer name and contact information can be accessed by their unique identifier. Retailers can have a single retail outlet or many retail outlets dispersed over wide geographical area, connected to a main office having a centralized database, in which case a provider would communicate with the main office.

Suitable customer loyalty programs could be administered in-house by the retailer or administered externally by a separate loyalty card service, as long as the retailer has access to the loyalty customer database to be able to extract customers' contact information. In any case, the important aspect is the ability to identify customers by a unique identifier and to be able to retrieve customer contact information from a database, referenced by the unique identifier. Ideal customer loyalty programs use a loyalty card issued to each customer subscribed to the loyalty program. The loyalty card has a unique identifier such as a membership number that is printed or embossed on the card, this unique identifier is also encoded into a barcode or magnetic stripe that is easily scanned at a point-of-sale device by a card-reader or barcode scanner. Such loyalty cards are well known in the art and thus their implementation will not be described here. Loyalty cards are generally used to track purchases of loyalty customers by associating their purchases with their loyalty card identifier which is scanned at the point-of-sale device at the time of checkout. The present invention extends the usefulness of such loyalty card programs to the tracking of consumer interest in a product or service, not just an actual purchase.

Providers suitable for this system include providers of services and products (hereinafter referred to a "service providers") that the retailer does not carry but would like to provide to their customers. Service providers must be able to exchange information electronically with the retailer on a daily basis. Examples of providers include, but are not limited to, insurance providers, veterinary care providers, veterinary clinics, animal shelters, animal rescue organizations, animal microchip database companies, travel agencies, and travel resorts.

Participating retailers will provide the service providers with a channel through which they can distribute information about a promoted service. Such a service can be promoted using the service provider's brand or alternatively, it could be marketed under the retailer's in-house brand.

One aspect of the present invention is a promotional brochure or coupon having a UPC associated with a zero value sale. Customers who are members of the retailer's loyalty card program are encouraged to scan the brochure at the checkout.

Customers receive special offers and enroll in services through the retailer that will ultimately improve their individual spend as well as provide those products and services to the customers at the right time and at the correct price levels. This is done by stratifying market sources based on demographic data; location of customer; types of products and services used; and buying patterns. The tracking of spending patterns for various products and services allows the retailer to assess and react to the spending patterns in a way that provides for maximum customer satisfaction and customer retention.

The provision of a mechanism through which customer-selected specific requests for services may be efficiently tracked and followed up within in a given time frame enhances the ability of providers to a) service the customers' needs and improves the returns to the providers on their marketing dollars.

The profile of services purchased by the customers may be used to reflect consumer choices in terms of a variety of services and through the linking of the information, may produce new offers of services for the customers who purchase the promoted service. For example, in the context of domestic pets, many animals are micro-chipped for identification and registered with a microchip database in case they are ever found or lost and need to be identified. The microchip number ("RFID") is registered by the pet owner and retained in a provider's information database. This present invention outlined will allow the retailer and the providers to tie the customer to their pet-specific consumable purchases, the RFID and the history of veterinary treatments for insured pets.

FIG. 1 illustrates the front side of an embodiment of a promotional coupon 100 of the present invention. A heading 102 identifies the coupon as a special offer coupon. A space 104 is provided for the service provider's logo. The special offer is elaborated at 106. In the embodiment of FIG. 1, the offer is for pet health insurance. The special promotional offer provides the first month of insurance for only $1.00.

An image 108, reinforces the message and can attract attention to the coupon when displaced on a retail store shelf. Instructions to the customer are provided at 110. The instructions encourage the customer to bring the brochure or coupon to the checkout to be scanned. The instructions provide information for the customer to initiate activation of enrollment in the insurance service. The instructions also point out that a representative of the service provider (insurance company in this case) will contact the customer, if the customer does not initiate contact. There is space at 112 on the front of the coupon for the retailer's logo.

Figure 2:
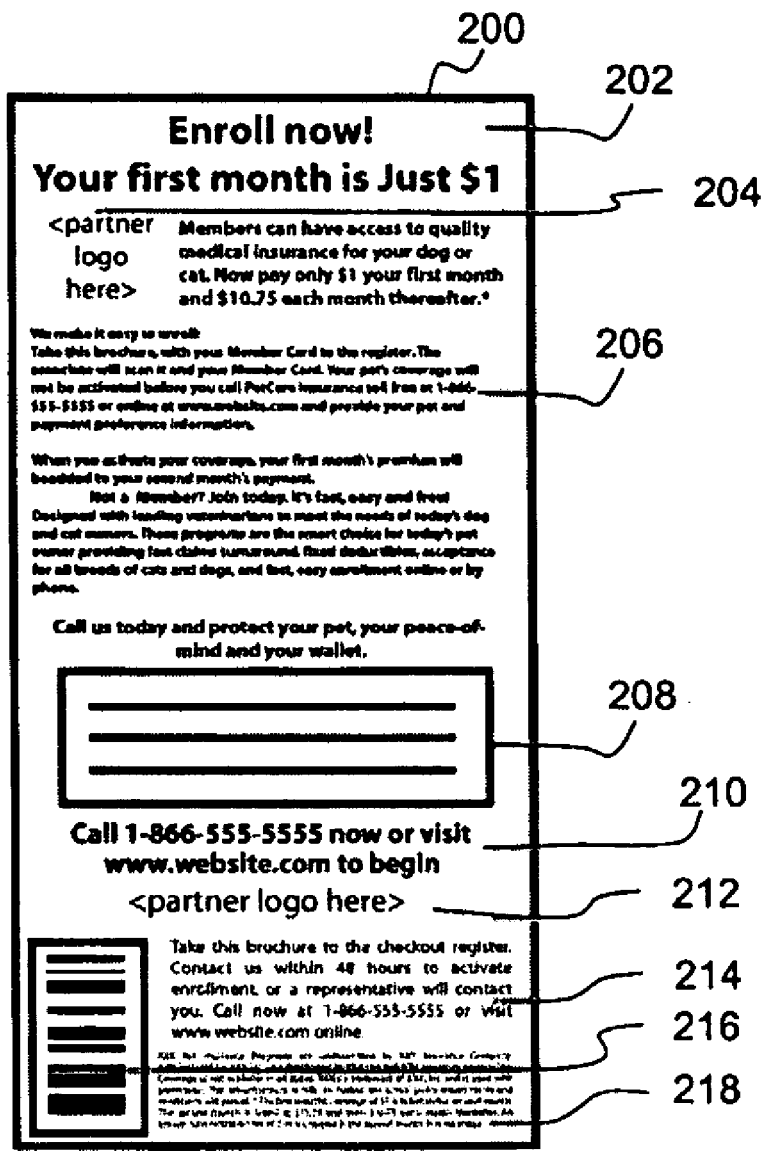
FIG. 2 illustrates the back side of an embodiment of a promotional coupon of the present invention.

FIG. 2 illustrates the back side 200 of the promotional coupon of the embodiment of FIG. 1. A heading 202 reinforces the heading 102 and the offering 106 of the front of the coupon. There is space 204 provided for the retailer's logo again. A detailed description 206 of the special offer is provided. The detailed description 206 points out that a retail loyalty card is required to process the special offer of the coupon, but that if the customer does not have a loyalty card, one can be obtained easily at the checkout. The coupon thus also promotes the retailer's loyalty card program in addition to the advertised service by the service provider. Further details can be provided such as explaining that scanning of the coupon does not constitute purchasing the service or activation of the service. The customer must contact the service provider and provide details of the pet and payment preferences to activate the insurance service. If the customer does not contact the service provider within 48 hours of scanning the coupon, the service provider will then contact the customer. Further details of the offered service are presented such as price chart 208. A call to action 210 is provided in bold text to further encourage the customer to initiate contact with the service provider after the coupon is taken home. The retailer's logo can be presented again at 212. The instructions of 110 can be repeated on the back side at 214. A legal line is presented at 218, outlining legal details such as limitations of the promotion, details of pricing and billing, etc.

A bar code 216 representing a universal product code (UPC) is provided. This bar code can be scanned at a point-of-sale device (cash register or checkout). The UPC for this bar code is registered with the retailer's inventory/transaction system as a zero cost item, thus when the coupon is scanned at the checkout, it will appear as a zero cost sale on the cash register receipt.

Figure 3:
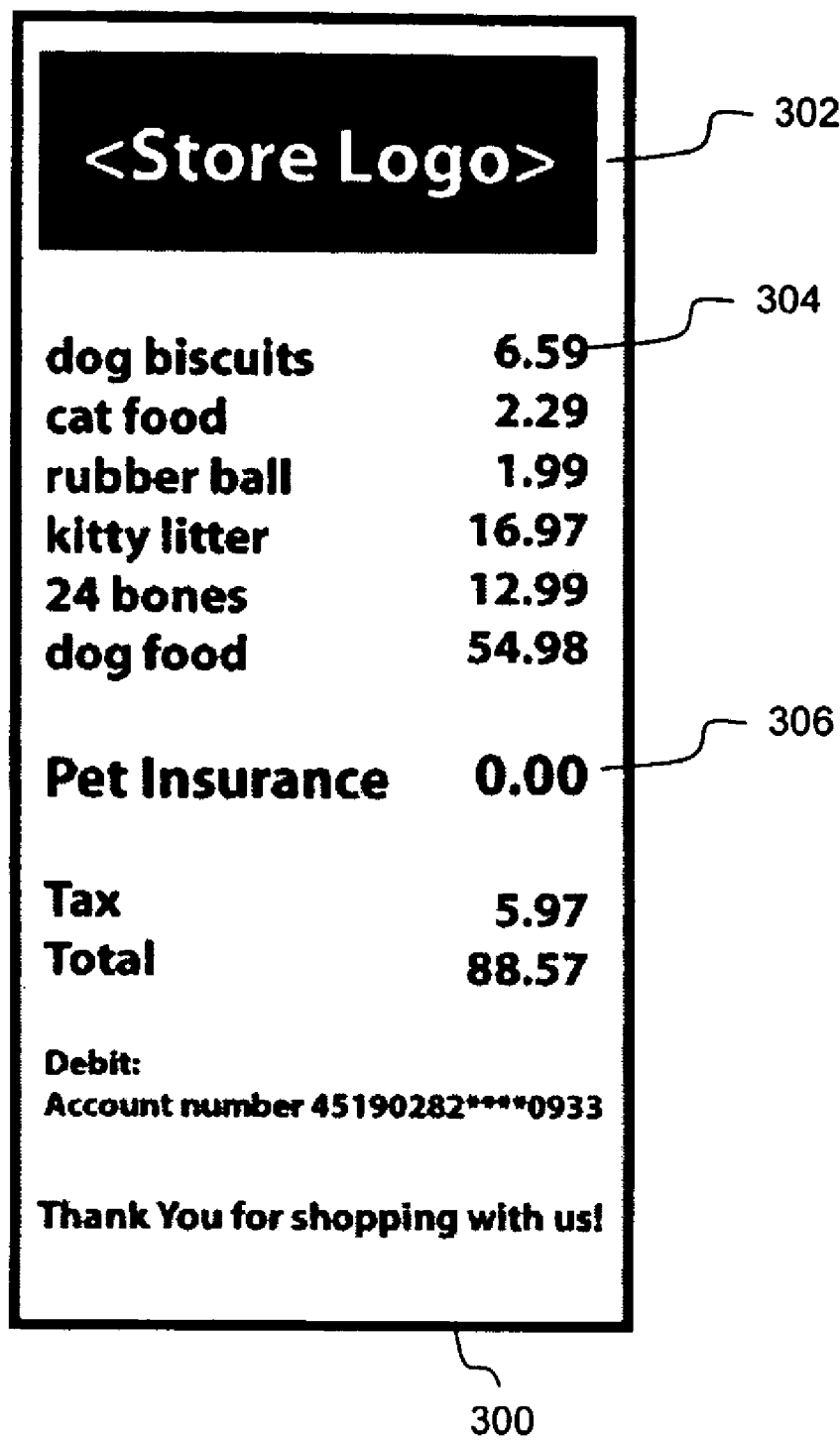
FIG. 3 illustrates an exemplary cash register receipt produced by an embodiment of the system of the present invention.

An exemplary cash register receipt 300, produced by an embodiment of the system of the present invention is illustrated in FIG. 3. The receipt 300 features a banner 302 with the retail store logo. Regular purchased items appear as at 304, with a brief description and sale price. The scanned promotional coupon appears on the sales receipt at 306 as a zero cost sale. It can be separated from other items by spaces and/or displayed in a larger font when the retail transaction system permits such options. A call to action for the promotion can also appear on the sales receipt to further reinforce the message of the promotional coupon.

Figure 4:
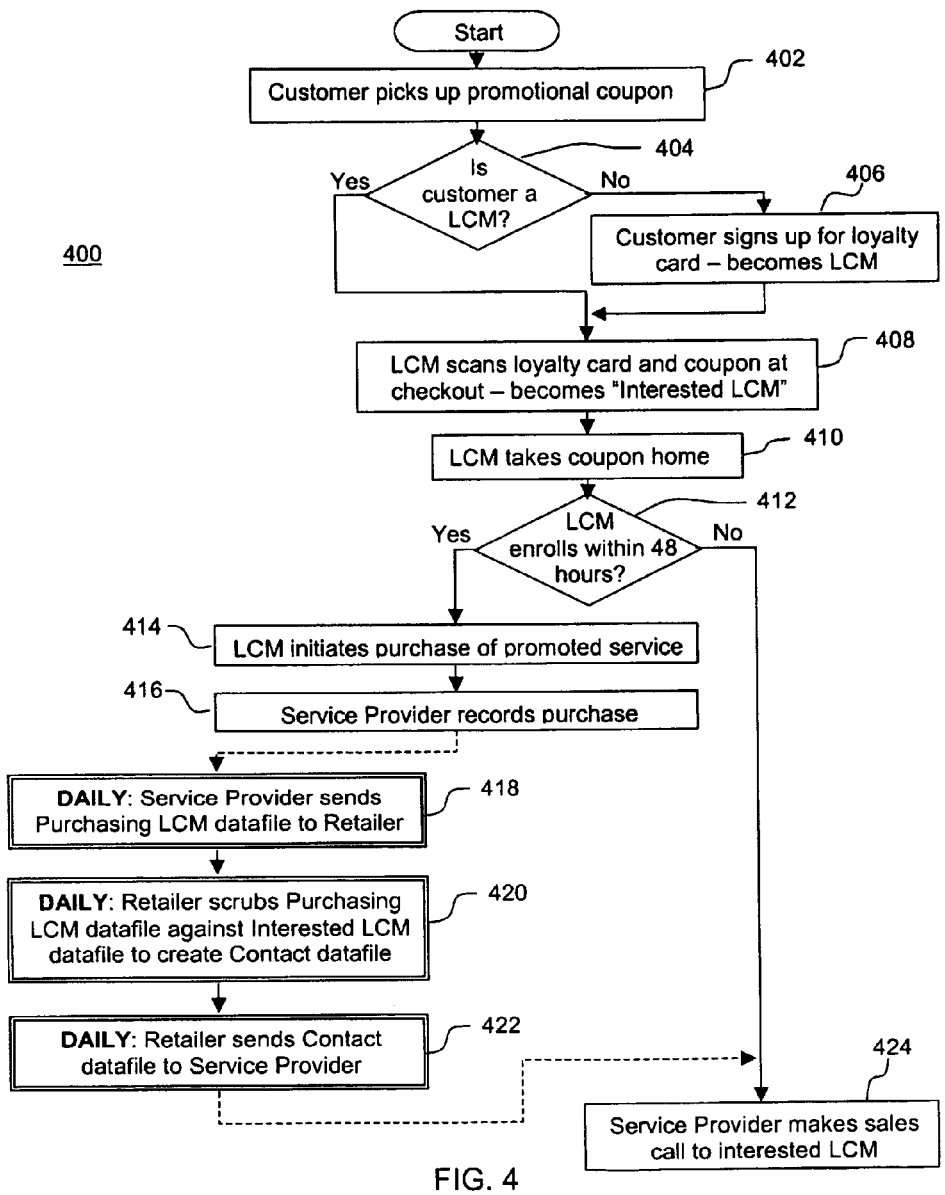
FIG. 4 is a flowchart of a customer centric aspect of an embodiment of the method of the present invention.

Promotional coupons such as those of FIGS. 1 and 2 are displayed in a retail store, such as for example, a pet store. The coupons can promote a offer of service such as, for example, pet health insurance service. Such services are not usually sold through retail stores for various business and regulatory reasons, but customers of such retail stores are a market well targeted to such services. FIG. 4 illustrates a flowchart 400 of a customer-centric aspect of an embodiment of the method of the present invention. The process 400 starts when a customer picks up the promotional coupon at step 402 while in the retail store. When the customer arrives at the checkout, the cashier will ask for the customer's loyalty card at step 404. If the customer is a loyalty card member (LCM), the cashier scans the loyalty card and the promotional coupon at the point-of-sale device at the checkout, along with any other purchases the customer may make (step 408). The customer can be considered as interested in the service by virtue of taking the concrete step of having the coupon scanned at the checkout. The retailer's point-of-sale system records and stores in a retail database, the scanned loyalty card number and associates it with the UPCs of scanned purchases and the scanned promotional coupons.

If the customer is not a loyalty card member, the cashier can sign up the customer right at the checkout at step 406. The customer fills out a form with his or her name, address, phone number and other relevant contact information, and a loyalty card is presented to the customer. The process can then continue at step 408 as previously described. The "interested" customer then takes the promotional coupon home (step 410). The promotional coupon has directions for the customer to sign up for the offered service. The coupon provides a toll-free telephone number to call or a website address to access for initiating contact with the provider offering the service. The "interested" customer can choose to initiate contact within 48 hours (or any other predetermined delay) (step 412). If the "interested" customer contacts the service provider to purchase the service, the customer is asked for the promotion coupon identifier, the customer's loyalty card number, store location where the coupon was obtained, the customer's name, address, telephone number, as well as details related to the service. In the case where the service is pet health insurance, the customer is asked for details related to the insurance such as the pet's name, breed, age, the pet's veterinarian, the amount of coverage required and payment option details. This exchange between the customer and the service provider can be conducted via telephone, if the customer uses the provided toll-free number, or by way of an on-line form or questionnaire, in the case where the customer contacts the service provider via a website.

The service provider then records the information obtained from the exchange with the customer, in their internal database (step 416). The information is used by the service provider as part of their regular business activities. If the customer did not scan the promotional coupon at the checkout before bringing it home, the customer can still benefit from the special offer promoted by the promotional coupon, provided the customer is a member of the retailer's loyalty card program. If a customer is not a loyalty card holder, and contacts the service provider, they cannot benefit directly from the special promotion, but they can become a valuable sales lead anyway. They can be solicited to purchase a regularly priced service or encouraged to return to the retailer to sign up for the loyalty card program and its attendant benefits.

The following three steps (418, 420, 422) are performed on a daily basis. They are described here in order to describe their relationship to customers' activities.

The service provider reports daily to the retailer with a list of the retailer's loyalty card members who have purchased the promoted service (step 418). As a minimum, the loyalty card numbers are reported to the retailer. In a preferred embodiment, a purchasing LCM datafile is prepared in which each record corresponds to a loyalty card customer who signed up for the promoted service. For each loyalty card number the following fields the datafile is are populated: loyalty card number, first name, last name, first address field, second address field, city, state, zip code, telephone number. In a preferred embodiment, the datafile is a tab-separated text file.

Optionally, other fields related to sales information can be populated, or these fields can be included in a second datafile. In a preferred embodiment, in the case of a pet insurance service being promoted, a second data file is populated with the following fields: loyalty card number, number of dog insurance policies purchased, the number of cat insurance policies purchased, and the date sold. This information can be used to provide the retailer with useful purchase history for each customer.

This reporting step serves several purposes. First, this information can be used by the retailer to identify from among the customers who have scanned the promotional coupon at the checkout, which have not yet contacted the service provider to purchase the promoted service. Secondly, this provides valuable feedback to the retailer on the effectiveness of the promotional coupon, such as which customers are purchasing the promoted service, which retail stores within a retail chain or which geographical areas are more successful with the promotion. Data can also be used by the retailer to cross-promote related products to these customers. Thirdly, because the purchasing customers' contact information is collected by the service provider, it can be used to update the contact information the retailer has on file for these customers as part of managing their loyalty card program.

The retailer performs a daily task of identifying which from among the customers who have scanned the promotional coupon at the checkout, which have not yet contacted the service provider to purchase the promoted service (step 420). The retailer receives the purchasing LCM datafile (from step 418) from the service provider, identifying all the loyalty card customers who purchased the promoted service in the last 24 hours. The retailer "scrubs" the purchasing LCM datafile against all the loyalty customers who scanned the promotional brochure at least 48 hours previous. The resulting contact datafile is a list of loyalty customers who scanned the promotional brochure but have not yet purchased the service. The file contains the contact information for these customers.

At step 422 the retailer performs a daily step of sending the contact datafile to the service provider. The service provider now has a list containing contact information of those retail loyalty card customers who expressed an interest in the promoted service but who have not yet initiated purchase of the service. This is a very powerful list of well targeted sales leads. This sales lead contact information is then transferred to the service provider's outbound sales call queue.

Thus, if interested loyalty customers have not contacted the service provider within 48 hours, the service provider will initiate a sales call to each of the interested customers. The results of the sales calls are tracked by the service provider. The service provider removes the records of interested customers who change their minds and decline the purchase of the service, from the outbound sales call queue. For interested customers who purchase the service, the service provider collects sales data similarly to step 416. These sales will then be reported back to the retailer the following business day.

Figure 5:
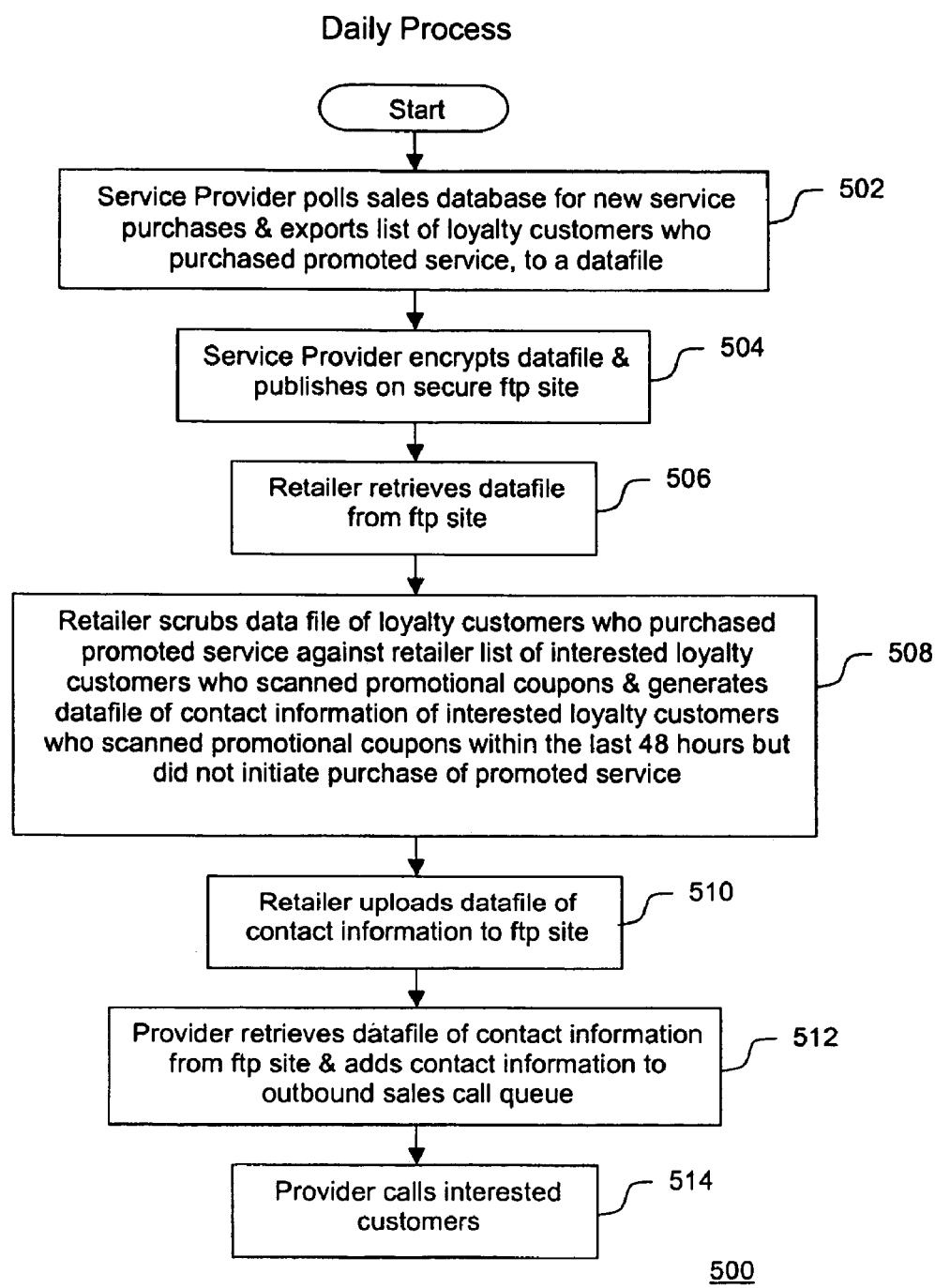
FIG. 5 is a flowchart of the daily process aspect of an embodiment of the method of the present invention.

The daily process of transferring data between the retailer and the service provider will be described in more detail with reference to FIG. 5. Whereas the customers' activities occur throughout the day, the daily process occurs once per day. At step 502, the service provider polls its sales database for new service purchases (or "activations") made in the preceding 24 hours (or since the last polling of new service purchases). A list of loyalty customers who made such purchases is compiled into a purchasing LCM datafile. The service provider encrypts the datafile and publishes it on a secure ftp site for access by the retailer (step 504). In a preferred embodiment, PGP encryption is used. Using a secure ftp site is convenient because it allows easy, secure communications with multiple retailers. Implementation of a secure ftp site is well known in the art and will not be described here. Other communication channels which would allow the transfer of datafiles between business entities would of course work also and are considered to be well within the scope of the present invention.

At step 506, the retailer accesses the provider's secure ftp site and retrieves the purchasing LCM datafile.

At step 508, the retailer accesses the retail database to create a list of "interested customers", that is, the loyalty customers who have recently scanned the promotional coupons. Large retail chains can have retail outlets dispersed over a wide geographic are that can span several time zones. Such large retail chains often require up to 48 hours to collect the retail sales data from all of their outlets or stores. In a preferred embodiment, a delay is introduced such that the list of interested customers is a list of customers who scanned the promotional coupon at least 48 hours previous.

The list of interested customers is than scrubbed against the purchasing LCM datafile to produce a list of residual customers who are interested customers who have not yet purchased the promoted service. The retailer accesses the loyalty program database to retrieve the contact information for residual customers. The retailer creates a contact datafile containing the contact information of the residual customers.

At step 510, the retailer accesses the provider's ftp site to upload the contact datafile. At step 512, the provider retrieves the contact datafile from the ftp site and adds the contact information to the outbound sales call queue of its sales call management system. At step 514, the provider's sales personnel uses the sales call queue to call the interested customers who have not yet purchased the promoted service.

The provider records sales data from the sales resulting from these outbound sales calls. The sales data is stored in the provider's sales database. The sales data is used by the provider as part of its regular business activities. The sales data is also used to report back to the retailer the following day (step 502), when the daily process of FIG. 5 commences again.

Figure 6:
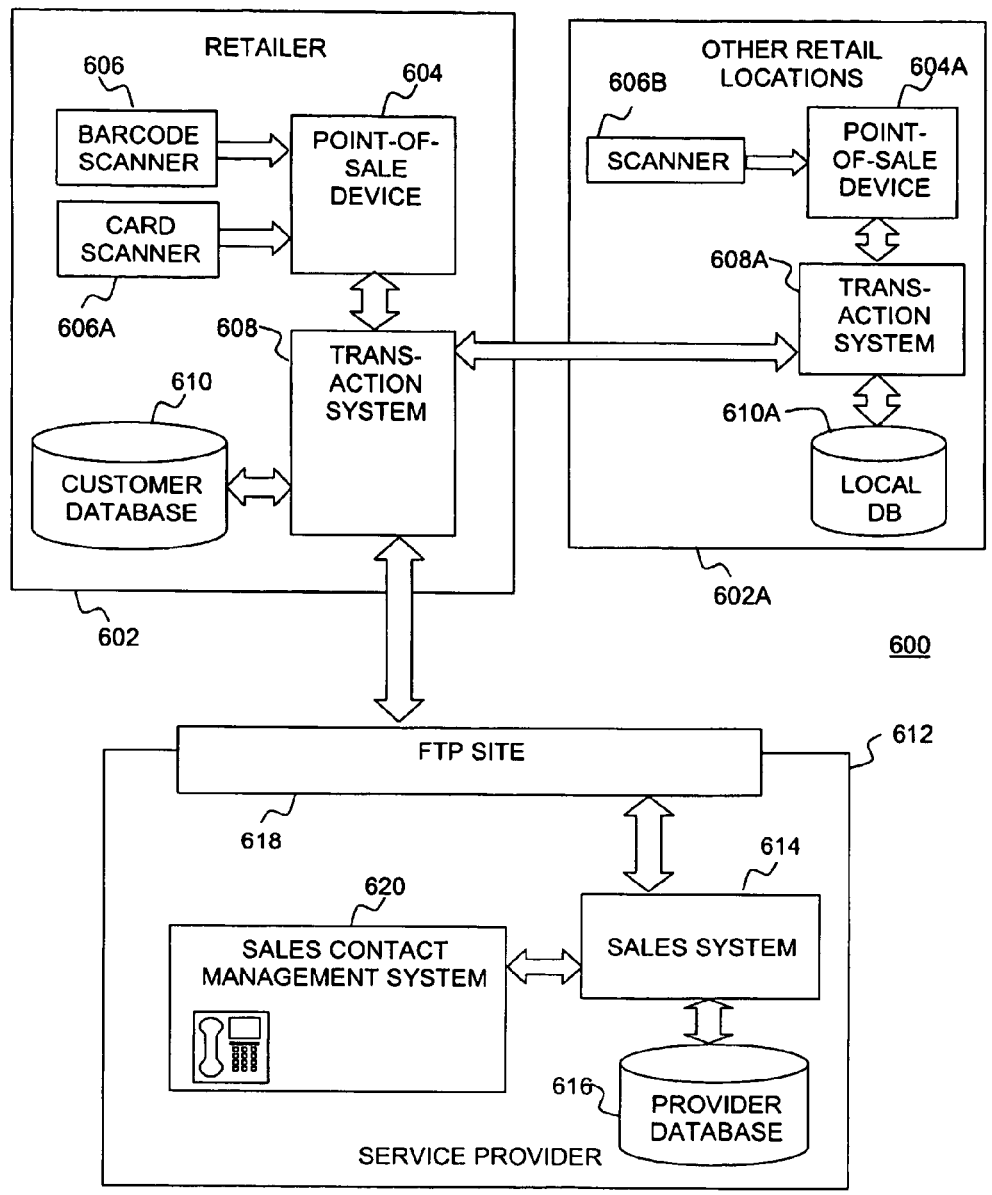
FIG. 6 is a block diagram illustrating principal components of an embodiment of the system of the present invention.

The system of the present invention will now be described with reference to FIG. 6 which illustrates principal elements of an exemplary embodiment of the present invention. The sales lead generation system 600 of the present invention provides a mechanism for generating well qualified sales leads using a promotional coupon, brochure or buckslip as previously described with reference to FIGS. 1 and 2. The promotional coupons are displayed at the retailer's premises 602. Interested customers can take the coupon to the checkout to be scanned by a barcode reader 606, connected to a point-of-sale device 604 (cash register). The cashier will request the customer's loyalty card which will also be scanned at the point-of-sale device 604. The loyalty card is scanned by the barcode reader 606, along with the customer's other purchases.

In another embodiment of the present invention, the loyalty card can have the customer's loyalty card identifier encoded in a magnetic stripe, and would then be scanned by a magnetic card reader 606A.

Another embodiment of the present invention could use another form of customer identifier such as a credit card or other type of identification which is tied into a database of customer contact information such as name, address, telephone number, etc.

The point-of-sale device 604 sends the sales transaction information to the retailer's transaction system 608. The transaction system has a zero cost value associated with the universal product code (UPC) of the promotional coupon. The promotional coupon thus appears as an entry on the cash register receipt and is treated as a zero-cost purchase. The transaction system 608 tracks the customer's purchases. The transaction system 608 can be later queried to obtain a list of customers who have scanned the promotional coupon.

The system 600 works with a single retail store 602 or with a chain of retail stores having multiple locations such as 602A. In the case of a chain of retail stores, the other retail location 602A, scan the promotional coupon as described above, with scanner 606B, connected to point-of-sale device 604A which in turn is connected to transaction system 608A. The transactions from other locations are then compiled at a central transaction system 608.

Customers who do not have a loyalty card can sign up for one at the point-of-sale as described previously.

Customers can contact the service provider 612 who is offering the service promoted by the coupon, by using the contact information provided on the coupon.

The sales staff of the service provider 612, can use a sales contact management system 620, to input sales information to a sales system 614, which stores information in a database 616.

On a daily basis, the service provider 612, polls its sales system 614, for the retailer's loyalty customers who have purchased or subscribed to the service in the previous 24 hours. The customers are identified by their loyalty card number and a datafile listing all these "purchasing" customers is compiled, encrypted for security, and posted on a secure ftp site 618, which is accessible to the retailer via the Internet.

Also on a daily basis, the transaction system 608 of the retailer 602, accesses the ftp site 618 to retrieve the datafile of "purchasing" customers. The transaction system then queries its records to obtain a list of the loyalty card identifiers of interested customers who have scanned the promotional coupons at least 48 hours previously. The list of interested customers is scrubbed against the list of "purchasing" customers to obtain a list of "residual" customers, who have demonstrated an interest in the service by scanning the coupon, but who have not yet purchased the service. The 48 hour time delay is convenient for large national scale retail organizations because it can sometimes take that long to compile all the sales data at the central transaction system. 48 hours is also a convenient time frame to allow customers to initiate contact with the service provider. The transaction system 608 of the retailer 602 then uses the list of "residual" customers' loyalty card numbers (customer identifiers) to poll the customer database 610 to obtain the contact information of the "residual" customers. The transaction system compiles the contact information, including loyalty card number, name, address, telephone number into a contact datafile of the "residual" customers; encrypts the datafile; and posts it to the service provider's secure ftp site 618.

Also on a daily basis, the sales system 614 of the service provider 612, retrieves the contact datafile of "residual" customers and uses it to populate the outbound sales call queue of the sales contact management system 620. The service provider's sales staff then uses the outbound call queue to contact the "residual" customers to encourage them to purchase or subscribe to the service. The sales call management system then records the sales, which are reported back to the retailer 602 the following day during he next daily cycle.

The present invention thus provides valuable, well qualified sales leads at a relatively low cost. The sales leads easy to generate and track and the system also provides valuable customer purchasing history for the retailer.

The embodiment(s) of the invention described above is(are) intended to be exemplary only. The scope of the invention is therefore intended to be limited solely by the scope of the appended claims.

We claim:

1. A method of sales lead generation for pet service providers, comprising the steps of:
   recording a customer identifier presented by a customer to a retailer at a retailer point-of-sale device;
   recording a promotion identifier code from a promotional material presented by said customer at said point-of-sale device, wherein said promotional material promotes a pet related service offered by a pet service provider, wherein said pet related service is not offered by said retailer;
   permitting said customer to retain said promotional material, said promotional material having directions for the customer to purchase said pet related service from said pet service provider;
   retrieving customer contact information for said customer from a database located at said retailer in response to recording the customer identifier and promotion identifier code;
   generating a customer contact information record based on customers who present said promotional material at said point-of-sale device;
   sending said customer contact information record to said pet service provider if the customer does not initiate the purchase of said pet related service within a predetermined period of time;
   wherein said promotion identifier code comprises a universal product code (UPC), and wherein the step of recording said promotion identifier code comprises scanning said UPC at said retailer point-of-sale device; and
   wherein the step of recording said promotion identifier code further comprises recording said UPC as a sale in a retail transaction system with a zero sale value.

2. A method as claimed in claim 1, wherein the step of recording a customer identifier comprises recording a loyalty customer number.

3. A method as claimed in claim 2, wherein the step of recording a loyalty customer number comprises scanning a loyalty card at said retailer point-of-sale device.

4. A method as claimed in claim 3, wherein the steps of retrieving customer contact information and sending said customer contact information record to said service provider are performed by a loyalty program service.

5. A method as claimed in claim 1, wherein the step of sending said customer contact information record is preceded by the steps of:
   receiving from said pet service provider a list of customers who have purchased said pet related service;
   comparing said list of customers who have purchased said pet related service with said customer contact information record; and
   scrubbing each respective customer who has purchased said pet related service from said customer contact information record.

6. A method as claimed in claim 5, further comprising the step of, at said pet service provider, adding said customer contact information to an outbound sales call queue.

7. A method as claimed in claim 1, wherein the pet related service is selected from the group consisting of pet insurance, veterinary clinic services, animal shelter services, animal rescue organization services, animal tagging services, and animal microchip database services.

8. A system for sales lead generation comprising:
   a customer identifier scanning device at a point-of-sale device at a retailer for scanning a customer identifier presented by a customer;
   a promotion identifier code scanning device at the point-of-sale device at said retailer for scanning a promotion identifier code associated with a pet related service presented by said customer;
   a retail transaction system adapted to accept input from said customer identifier scanning device and said promotion identifier code scanning device;
   a customer database for storing customer contact information associated with said input from said customer identifier scanning device and said promotion identifier scanning device; and a sales system at a pet service provider operable to communicate with said customer database.

wherein said retail transaction system is operable to retrieve customer contact information from said customer database in response to accepting said promotion identifier code and said customer identifier presented by said customer to communicate said customer contact information to said sales system; and wherein said retail transaction system is adapted to associate a zero value purchase with said promotion identifier; and wherein said pet related service is not offered by said retailer.

9. A system for sales lead generation as claimed in claim 8 wherein said retail transaction system is adapted to communicate said customer contact information to said sales system only if said customer does not initiate the purchase of said pet related service within a predetermined period of time.

10. A system for sales lead generation as claimed in claim 9 wherein said retail transaction system is further adapted to receive from said sales system, a list of customers who have purchased said pet related service within said predetermined period of time and verifying that said customer has not purchased said pet related service within said predetermined period of time.

11. A system for sales lead generation as claimed in claim 10 wherein said retail transaction system is further adapted to verify that said customer has not purchased said pet related service, by removing records of customers who have purchased said pet related service, from said customer contact information to be communicated to said sales system.

12. A system for sales lead generation as claimed in claim 11 wherein said sales system is adapted to add said customer contact information to an outbound sales call queue.

13. A system for sales lead generation as claimed in claim 12 wherein said promotion identifier code scanning device comprises a barcode scanner adapted to scan said promotion identifier code encoded as a bar code.

14. A system for sales lead generation as claimed in claim 13 wherein said barcode scanner is adapted to read a universal product code (UPC) barcode from said promotion identifier.

15. A system for sales lead generation as claimed in claim 14 where said customer identifier scanning device comprises said barcode scanner, which is adapted to scan said customer identifier encoded as a barcode.

16. A system for sales lead generation as claimed in claim 15 wherein said customer identifier scanning device is adapted to scan said customer identifier barcode from a customer loyalty card.

17. A system for sales lead generation as claimed in claim 14 wherein said customer identifier scanning device comprises a magnetic card reader and is adapted to scan a customer identifier encoded on a magnetic strip on a card.

18. A system for sales lead generation as claimed in claim 14 wherein said promotion identifier code scanning device is adapted to scan said promotion identifier UPC barcode from a promotional material which is selected from the group consisting of brochure, coupon, flyer, shelf marker, buckslip and poster.

19. A system for sales lead generation as claimed in claim 18 wherein said retail transaction system is a centralized retail transaction system for a plurality of retailer outlets.

20. A system for sales lead generation as claimed in claim 19 wherein each of said plurality of retailer outlets has a local retail transaction system and said centralized retail transaction system can communicate with each said local retail transaction system.

21. A system for sales lead generation as claimed in claim 20, wherein the service provider is selected from the group consisting of insurance provider, veterinary clinic, animal shelter, animal rescue organization, animal tagging service, and animal microchip database service.

22. A method of sales lead generation for a service provider initiated by a customer interested in a promotion for a pet related service, comprising the steps of:

recording a customer identifier presented by said customer, at a retailer point-of-sale device;

recording a promotion identifier code from a promotional material presented by said customer at said point-of-sale device, said promotional material promoting said service, wherein said service is not offered by said retailer;

permitting said customer to retain said promotional material, said promotional material having directions for the customer to purchase said service directly from said service provider;

accepting said customer identifier and said promotion identifier code by a retail transaction system;

associating said promotion identifier code with a zero value purchase by said retail transaction system;

retrieving customer contact information for said customer from a customer database by said retail transaction system;

receiving from said service provider, a list of customers who have already purchased said service;

verifying that said customer has not yet purchased said service;

sending said customer contact information to said service provider; and adding said customer contact information to an outbound sales call queue at said service provider.

23. A method as claimed in claim 22, wherein said step of verifying that said customer has not yet purchased said service is performed at a preset time after said step of recording said promotion identifier code.

24. A method as claimed in claim 23, wherein said preset time is 48 hours.

25. A method as claimed in claim 23, wherein said step of verifying that said customer has not yet purchased said service comprises removing records of customers who have purchased said service, from said customer contact information to be sent to said service provider.

26. A method as claimed in claim 22, wherein said pet related service is selected from the group consisting of insurance provider, veterinary clinic, animal shelter, animal rescue organization, animal tagging service, and animal microchip database service.

27. A method as claimed in claim 25, wherein said promotion material is selected from the group consisting of brochure, coupon, flyer, shelf marker, buckslip and poster.

28. A method as claimed in claim 26, wherein said promotion material is a brochure having said promotion identifier code encoded as a universal product code (UPC) barcode and wherein said step of recording said promotion identifier code comprises scanning said UPC barcode.

29. A method as claimed in claim 25, wherein said step of recording a customer identifier comprises scanning a customer loyalty card.

30. A method as claimed in claim 22, wherein the service provider is selected from the group consisting of insurance provider, veterinary clinic, animal shelter, animal rescue organization, animal tagging service, and animal microchip database service.

31. A method of sales lead generation for pet insurance service provider, initiated by a customer interested by a promotion for pet insurance, comprising the steps of:

scanning a customer loyalty card presented by said customer to obtain a customer identifier at a retailer point of sale device;

scanning a promotion identifier code from a promotional material presented by said customer, at said point-of-sale device, said promotional material promoting said pet insurance service, wherein said pet insurance service is not offered by said retailer;

permitting said customer to retain said promotional material, said promotional material having directions for the customer to contact directly said pet insurance provider to initiate purchase of said pet insurance service;

accepting said customer identifier and said promotion identifier code by a retail transaction system of said retailer;

processing said promotion identifier code as if it was a zero value purchase by said retail transaction system;

retrieving customer contact information for said customer from a customer database by said retail transaction system;

adding said customer contact information to a list of customers interested in said pet insurance service;

receiving from said pet insurance provider a list of customers who have already purchased said service after a predetermined time delay;

removing records of customers who have already purchased said service from said list of customers interested in said pet insurance service;

sending said list of customers interested in said pet insurance service from said retailer to said pet insurance service provider; and adding said customer contact information from said list of customers interested in said pet insurance to an outbound sales call queue to enable said pet insurance provider to contact said customer interested by said promotion for pet insurance to purchase said pet insurance service.

* * * * *